United States Patent
Shimogawa

(10) Patent No.: US 8,516,482 B2
(45) Date of Patent: Aug. 20, 2013

(54) VIRTUAL MACHINE ASSIGNING METHOD AND STORAGE MEDIUM THEREOF, INFORMATION PROCESSING DEVICE HAVING VIRTUAL MACHINE ENVIRONMENT

(75) Inventor: Kenichirou Shimogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 213 days.

(21) Appl. No.: 13/160,611

(22) Filed: Jun. 15, 2011

(65) Prior Publication Data

US 2011/0246990 A1   Oct. 6, 2011

Related U.S. Application Data

(63) Continuation of application No. PCT/JP2009/000515, filed on Feb. 9, 2009.

(51) Int. Cl.
*G06F 9/455* (2006.01)
*G06F 9/46* (2006.01)

(52) U.S. Cl.
USPC .............................................. 718/1; 718/104

(58) Field of Classification Search
None
See application file for complete search history.

(56) References Cited

U.S. PATENT DOCUMENTS

| 4,736,318 | A | 4/1988 | Delyani et al. |
| 8,255,906 | B2 * | 8/2012 | Ding et al. ................. 718/1 |
| 2002/0112102 | A1 | 8/2002 | Tarui et al. |
| 2008/0104589 | A1 * | 5/2008 | McCrory et al. ............... 718/1 |

FOREIGN PATENT DOCUMENTS

| JP | 61-262938 | 11/1986 |
| JP | 63-221448 | 9/1988 |
| JP | 7-110774 | 4/1995 |
| JP | 2002-215408 | 8/2002 |
| JP | 2003-177928 | 6/2003 |
| JP | 2006-59052 | 3/2006 |

* cited by examiner

*Primary Examiner* — Kenneth Tang
(74) *Attorney, Agent, or Firm* — Staas & Halsey LLP

(57) ABSTRACT

In a system 1 to which the present invention is applied, a plurality of dispatch times for assigning a virtual machine created in an information processing device are set, the plurality of set dispatch times are sequentially assigned, the virtual machine measures a response time needed for an input/output using an external storage device configuring the information processing device, and an input/output device such as a communication device or the like, and an optimum dispatch time of the virtual machine is identified and applied based on a change of the dispatch time of the measured response time. By applying the optimum dispatch time, the execution efficiency of the virtual machine is prevented from being degraded while high response performance is being maintained.

9 Claims, 10 Drawing Sheets

| ITEM | DESCRIPTION | STORAGE EXAMPLE |
|---|---|---|
| Time1 | MEASUREMENT TIME 1 | 13:00:00 |
| IO Time1 | IO RESPONSE TIME 1 | 5ms |
| Time2 | MEASUREMENT TIME 2 | 13:00:05 |
| IO Time2 | IO RESPONSE TIME 2 | 6ms |
| ..... | ..... | ..... |
| Count | NUMBER OF MEASUREMENTS | 10 |

F I G. 4

| ITEM | DESCRIPTION | STORAGE EXAMPLE |
|---|---|---|
| Response | IO RESPONSE AVERAGE TIME | 5.22ms |

F I G. 5

| ITEM | DESCRIPTION | STORAGE EXAMPLE |
|---|---|---|
| domain | DOMAIN NAME | domain1 |
| Dispatch1 | FIRST DISPATCH TIME 1 | 1ms |
| IO_Time1 | IO RESPONSE AVERAGE TIME 1 | 5.22ms |
| Dispatch2 | SECOND DISPATCH TIME 2 | 1.5ms |
| IO_Time2 | IO RESPONSE AVERAGE TIME 2 | 5.23ms |
| .... | .... | .... |
| Dispatch10 | 10TH DISPATCH TIME 10 | 5.0ms |
| IO_Time10 | IO RESPONSE AVERAGE TIME 10 | 7.0ms |
| Dispatch11 | 11TH DISPATCH TIME 11 | 5.5ms |
| IO_Time11 | IO RESPONSE AVERAGE TIME 11 | 7.5ms |
| .... | .... | .... |

FIG. 6

| EVALUATION ITEM | (1) | (2) | (3) | (4) |
|---|---|---|---|---|
| HYPERVISOR OVERHEAD | MEDIUM | LARGE | LARGE | SMALL○ |
| IO RESPONSE | MEDIUM | SHORT○ | SHORT○ | SHORT○ |
| OPTIMIZATION WHEN WORKLOADS COEXIST | MEDIUM | BAD | GOOD○ | GOOD○ |
| MEASURES TAKEN TO COPE WITH WORKLOAD CHANGE | MEDIUM | BAD | GOOD○ | GOOD○ |

F I G. 7

VIRTUAL MACHINE ASSIGNING METHOD AND STORAGE MEDIUM THEREOF, INFORMATION PROCESSING DEVICE HAVING VIRTUAL MACHINE ENVIRONMENT

CROSS-REFERENCE TO RELATED APPLICATION

This application is a continuation application of International PCT Application No. PCT/JP2009/000515 which was filed on Feb. 9, 2009.

FIELD

An embodiment of the present invention relates to a virtual machine assigning method and an information processing device having a virtual machine environment.

BACKGROUND

A VM (Virtual Machine) technique is a technique for logically or physically partitioning (or dividing) hardware possessed by a computer such as an information processing device or the like, and for making an OS (Operating System) run on partitioned (or divided) hardware. With the virtual machine technique, an OS is made to run on each piece of hardware virtualized by partitioning hardware, whereby a plurality of OSs can be made to run as the entire computer. Each of the OSs (guest OSs) running on the partitioned hardware logically implements one computer. This means that computers such as a plurality of servers or the like can be integrated into one computer. Accordingly, the virtual machine technique offers an advantage of reducing the number of computers (physical machines) to be introduced, and an advantage of simplifying a network configuration.

On virtual machines that are computers logically implemented with the virtual machine technique, programs as workloads are respectively executed. Normally, different workloads are respectively executed on virtual machines. The workloads can be sorted according to their properties. As typical examples of types of the workloads, a CPU (Central Processing Unit)-bound job, and an IO (Input Output)-bound job can be cited.

The CPU-bound job is a workload that mainly executes a calculation process by a CPU. The CPU-bound job has a property such that a response time that is a processing time of a workload from when a CPU issues an IO request to an IO device until when the IO device makes an IO response to the CPU decreases with an increase in the number of CPUs assigned to workloads.

The IO-bound job is a workload that relatively makes an IO to/from a recording medium for storing data (a storage device to which an access is relatively made slowly), or an IO to/from a network. This is typified by a database system. The IO-bound job has a property such that a processing time of a workload reduces with a decrease in a time period needed to complete an IO.

In a computer where a virtual machine system environment is implemented, workloads having different properties are respectively executed on virtual machines in normal cases.

In a virtual machine system, a virtual machine monitor (hypervisor) as a virtual machine monitoring unit assigns a CPU as a computation resource to each virtual machine. Typically, both a method implemented by setting a dispatch timer and a method implemented by detecting an idle state are used together as a method for returning a control of a CPU from a virtual machine to which the CPU is assigned to the hypervisor.

With the method implemented by setting a dispatch timer, a timer is set when a CPU is assigned to a virtual machine, and a control of the CPU is returned to the hypervisor by measuring a predetermined time period (dispatch time that is a time period for assigning a CPU) with the timer. If the control of the CPU is returned to the hypervisor with this method, it can be determined that a workload executed in the virtual machine is a CPU-bound job.

With the method implemented by detecting an idle state, a control of a CPU is returned from a virtual machine to the hypervisor at timing when the virtual machine enters a state of waiting for completion of an IO, namely, enters an idle state. If the control of the CPU is returned to the hypervisor with this method, it can be determined that a workload executed by the virtual machine is an IO-bound job.

If the above described two methods are used together, the execution efficiency of an IO-bound job executed in a virtual machine is heavily influenced by other virtual machines. In a virtual machine where a CPU-bound job is executed, a relatively long dispatch time needs to be set. For this reason, the number of times that a CPU is assigned per unit time decreases with an increase in the number of other virtual machines where a CPU-bound job is executed, leading to degradation in the execution efficiency. Accordingly, in a virtual machine where an IO-bound job is executed, it is important to prevent the execution efficiency from being degraded. Here, the executing efficiency is a ratio at which a workload executes a significant process per unit time.

As a method for preventing the execution efficiency in a virtual machine where an IO-bound job is running from being degraded, a method implemented by setting a short dispatch time, and a method implemented by preferentially assigning a CPU to a virtual machine in an IO completion interrupt wait state are considered. However, these methods have the following problems.

With the method implemented by setting a short dispatch time, a CPU control right that is a right to control a CPU is passed faster to a virtual machine where an IO-bound job is executed by shortening a time interval of passing the CPU control right to a virtual machine. With this method, however, the amount of a process executed by a hypervisor grows with an increase in the number of times of switching the CPU control right per unit time, so that an overhead that consumes machine resources in portions other than an original objective portion increases. An increase in the overhead not only degrades the performance of the entire virtual machine system but reduces the number of times that a CPU is assigned to a virtual machine per unit time. Consequently, the execution efficiency of each virtual machine is unwillingly decreased. Therefore, this method is undesirable.

With the method implemented by preferentially assigning a CPU to a virtual machine in an IO completion interrupt wait state, a virtual machine waiting for IO completion is detected, and IO completion is preferentially notified to the virtual machine. With this method, however, if the number of virtual machines executing an IO-bound job increases, it becomes difficult to pass the CPU control right to a virtual machine executing a CPU-bound job. Moreover, it becomes necessary to detect a virtual machine waiting for an IO completion interrupt. Therefore, the amount of a process executed by a hypervisor increases, leading to an increase in an overhead. Accordingly, also this method is undesirable.

Patent Document 1: Japanese Laid-open Patent Publication No. 2002-215408

Patent Document 2: Japanese Laid-open Patent Publication No. 2006-059052

Patent Document 3: Japanese Laid-open Patent Publication No. 07-110774

SUMMARY

In one system to which the present invention is applied, a dispatch time is assigned to a virtual machine created on an information processing device that has a virtual machine monitoring unit, is equipped or connected with an input/output device and includes a processor (such as a CPU). The assignment is made in a way such that the virtual machine monitoring unit partitions the processor into a plurality of partitioned processors, sets a plurality of assignment times of virtual machines in the plurality of partitioned processors, and assigns the virtual machines to the plurality of partitioned processors based on the plurality of assignment times, and the plurality of partitioned processors to which the virtual machines are assigned measure a response time from an output of an input/output request to the input/output device until an input of a response to the input/output request from the input/output device in each of the plurality of assignment times, extract an optimum assignment time that is a maximum assignment time among assignment times corresponding to response times within a predetermined range based on the plurality of set assignment times and a plurality of measured response times, and assign the extracted optimum assignment time to the Virtual machines.

Component that the information processing device can use as hardware resources correspond to the input/output device. Specifically, the input/output device is an external storage device, a communication device and the like that can be included, connected or the like. By focusing attention on a change in a response time, a range of a dispatch time that can prevent a response from being degraded or can reduce degradation in a response can be identified. As a result, a maximum or nearly maximum dispatch time that can achieve high response performance can be also identified.

The longer a set dispatch time, the lighter a load imposed on assignment of a processor (physical CPU) to a virtual machine. Therefore, hardware resources can be more efficiently assigned to virtual machines. The identified maximum or nearly maximum dispatch time reduces the load imposed on the assignment of a physical CPU to a virtual machine to a minimum level while maintaining high response performance. Degradation in a response tends to significantly degrade the entire performance of the information processing device (physical machine). Therefore, the identified maximum or nearly maximum dispatch time is optimum as a dispatch time. By automatically adjusting a dispatch time to such an optimum one, a CPU control right can be assigned to a virtual machine while preventing an execution efficiency from being degraded regardless of a type of a running workload.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a structure of IO response time measurement data;

FIG. 5 illustrates a data structure of an IO response for a hypervisor notification;

FIG. 6 illustrates a structure of average IO response accumulation data;

FIG. 7 illustrates contents of evaluations of this embodiment and conventional techniques respectively for evaluation items;

DESCRIPTION OF EMBODIMENTS

An embodiment according to the present invention is described in detail below with reference to the drawings.

Figure 1:
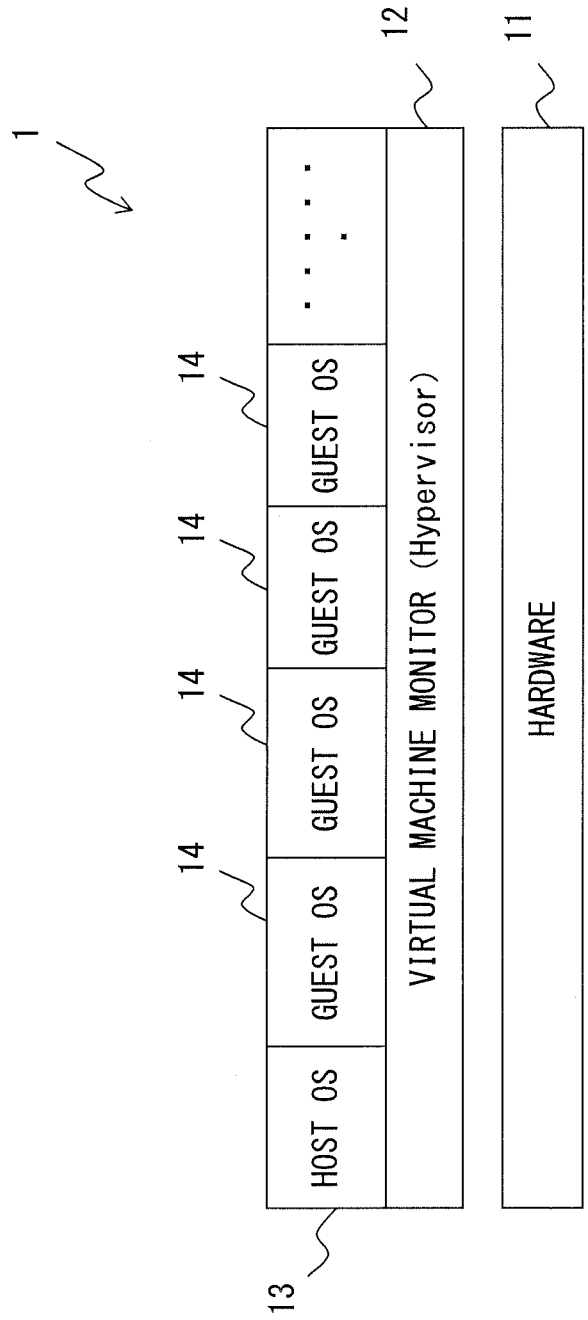
FIG. 1 illustrates a system configuration of a computer according to an embodiment.

FIG. 1 illustrates a system configuration of a computer as an information processing device where a virtual machine system according to the embodiment is implemented. The system configuration illustrated in FIG. 1 represents an environment when the computer 1 is operating. Hardware 11 that configures the computer 1 is partitioned (or divided) by a virtual machine monitor (hypervisor) 12 as a virtual machine monitoring unit, so that a virtual machine environment is implemented and the hypervisor 12 dynamically and transparently assigns the partitioned (or divided) hardware to workloads.

A virtual machine 13 is automatically activated at startup of the hypervisor 12. On the virtual machine 13, a host OS (Operating System) is running. The host OS controls activation, deactivation and the like of each virtual machine 14 where a guest OS runs. Moreover, the host OS includes various types of drivers for operating the hardware 11.

The hypervisor 12 decides, for each activated virtual machine 14, a CPU to which a control right is to be assigned, and a dispatch time for assigning the control right, and performs scheduling for assigning the control right according to the decided CPU and dispatch time. The dispatch time is decided as follows. How to decide the dispatch time is specifically described with reference to FIG. 3.

Figure 3:
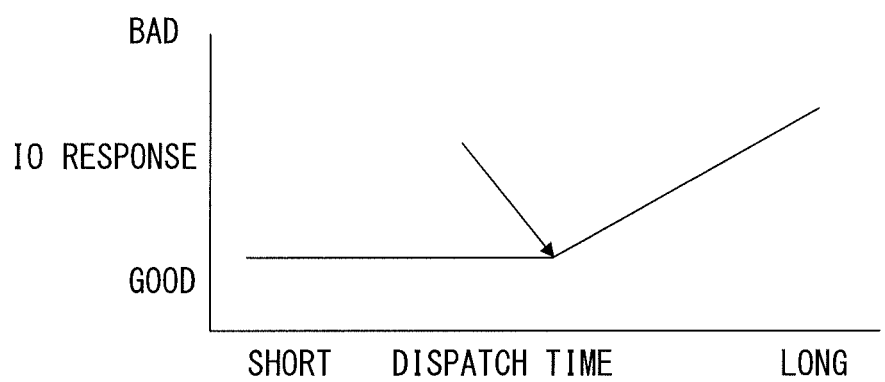
FIG. 3 illustrates a relationship between a dispatch time and an IO response.

FIG. 3 illustrates a relationship between the dispatch time and an IO response time. Horizontal and vertical axes represent the dispatch time and the IO response time, respectively. The IO response time is an actual execution time of an IO.

Actual execution of an IO needs a time period. Accordingly, the IO response time is constant to some extent even though the dispatch time is increased. If the dispatch time is increased more, an interrupt wait time caused by an IO occurs, leading to degradation (increase) in the IO response time.

The above described relationship exists between the dispatch time and the IO response time. In this embodiment, the dispatch time is decided for each virtual machine 14 by focusing attention on the relationship. As a result, a point where the IO response time changes as indicated by an arrow in FIG. 3 is identified, and a dispatch time at the identified change point is set for each virtual machine 14.

As described above, a dispatch time is decided (set) by using an IO response time as a reference in this embodiment.

The reason is that an IO response heavily influences the entire performance since a plurality of partitioned hardware resources simultaneously access an IO resource such as one HDD, network card or the like in the virtual machine system in some cases. Namely, if the IO response is bad, an IO wait time occurs in the plurality of partitioned hardware resources, leading to a lot of degradation in the performance of the entire computer. Therefore, as long dispatch time as possible is assigned while the IO response performance is kept high.

The longer an assigned dispatch time, the smaller the number of times that the CPU control right is switched per unit time. Accordingly, an overhead of the hypervisor 12 is reduced more. As a result, also the execution efficiency of each virtual machine 14 can be prevented from being decreased by an increase in the overhead. Consequently, an optimum dispatch time can be set.

The relationship illustrated in FIG. 3 exists regardless of types of IO resources. Accordingly, the IO resources are not particularly limited. Moreover, a process executed by a virtual machine sometimes uses a plurality of types of IO resources. For such a process, it is desirable to decide a dispatch time by focusing attention on an IO resource of a type that most influences the execution efficiency.

Operations for optimizing a dispatch time are hereinafter described with reference to FIGS. 2 and 4 to 10.

Figure 2:
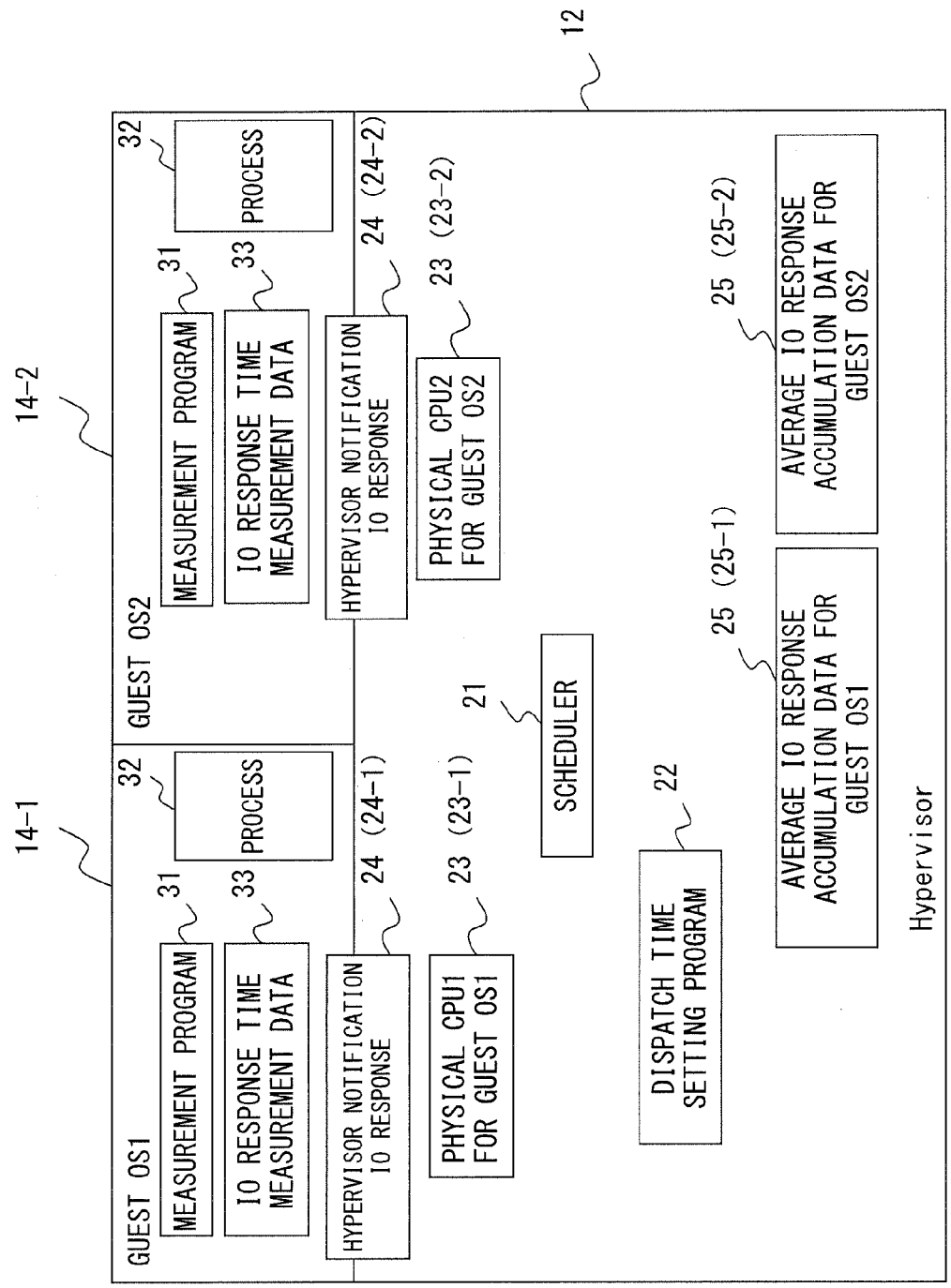
FIG. 2 illustrates a hypervisor 12 and a program structure of virtual machines 14.

FIG. 2 illustrates the hypervisor 12 and a program structure of the virtual machines 14. FIG. 2 summarizes programs and data, which are especially important to set a dispatch time.

A guest OS 1 running on the virtual machine 14-1 includes a measurement program 31. The measurement program 31 is a program for measuring an IO response time, namely, a time period actually needed for an IO response time in a process 32 being executed on the guest OS 1. A result of the measurement is stored as IO response time measurement data 33. The process 32 is equivalent to a process of a workload itself being executed. Also in the virtual machine 14-2, a guest OS 2 including the measurement program 31, a process 32 being executed on the guest OS 2, and IO response time measurement data 33 exist. Only one process 32 is illustrated. In many cases, however, a plurality of processes 32 exist.

Actually, the measurement program 31 measures an IO response time respectively for IO resources. For the sake of explanation, however, only one type of an IO resource is assumed here. The assumed IO resource is a type that most influences the execution efficiency.

FIG. 4 illustrates a structure of the IO response time measurement data 33.

The measurement program 31 measures an IO response time of the process 32. Accordingly, the IO response time measurement data 33 stores previous measurement results as illustrated in FIG. 4. To the respective measurement results, a measurement time at which a measurement is made is attached. Therefore, data of one measurement includes data of two items such as a measurement time and an IO response time. In FIG. 4, the measurement results are denoted as "IO TimeN" (N is an integer), and the measurement time is denoted as "TimeN" (N is an integer). "N" represents an order of measurements made.

The hypervisor 12 includes a scheduler 21 for performing scheduling for giving the CPU control right to each virtual machine 14, and a dispatch time setting program 22 for setting a dispatch time of each virtual machine 14.

The scheduler 21 sets a physical CPU (actual CPU) to be assigned to each virtual machine 14. 23 represents setting data indicating a physical CPU assigned to each virtual machine 14. 23-1 represents setting data for the virtual machine 14-1, whereas 23-2 represents setting data for the virtual machine 14-2.

In the setting data 14-1 and 14-2, "physical CPU 1" and "physical CPU 2" are respectively written. In this embodiment, different physical CPUs are fixedly assigned to the respective virtual machines 14 in this way. This is because operations of other virtual machines 14 influence an IO response if the plurality of virtual machines 14 are operated in the same physical CPU. In other words, influences exerted by the operations of the other virtual machines are eliminated to more accurately measure an IO response time.

The hypervisor 12 obtains, from each virtual machine 14, a hypervisor notification IO response 24 (hereinafter abbreviated to an IO response 24) that stores a measured IO response time. FIG. 5 illustrates a data structure of the IO response 24. In this embodiment, an average value (IO response average time) of measured IO response times is stored in the IO response 24 as illustrated in FIG. 5. The reason is that the IO response time is not always constant because it varies according to a load state of an IO as illustrated in FIG. 4. Otherwise, a plurality of time periods that are a plurality of time frames may be partitioned, the number of IO response times (measurement results) respectively corresponding to the time periods may be counted, and an IO response time corresponding to a time period having the largest count value, namely, an IO response time having a frequency expected to be highest may be notified.

The obtainment of the IO response 24, in other words, a notification of the IO response 24 from each virtual machine 14 can be made with an existing method such as a hypervisor call, a system call or the like. The measurement program 31 is included in a standard OS. Therefore, a guest OS does not need to be changed if the existing method is used. It is not necessary to use the existing method when a guest OS is changed.

The measurement program 31 is activated, for example, with a predetermined command issued from the hypervisor 12, so that a measurement is started. The measurement is terminated with a command to instruct a termination issued from the hypervisor 12. The measurement program 31 is made to run in a time period needed to set at least an optimum dispatch time.

The dispatch time setting program (hereinafter abbreviated to a time setting program) 22 sets a dispatch time for each of the virtual machines 14. To identify an optimum dispatch time, different dispatch times are sequentially set. The scheduler 21 assigns the CPU control right to a corresponding virtual machine 14 in the set dispatch time. The dispatch time set to identify the optimum dispatch time is a temporary time. Therefore, this dispatch time is hereinafter referred to distinctively as a temporary dispatch time for the sake of convenience.

Each of the virtual machines 14 causes the measurement program 31 to measure an IO response time in the process 32, and stores a measurement result in the IO response time measurement data 33 along with a measurement time (current time). The IO response 24 that stores an IO response average time obtained from the measurement data 33 passes a measurement result to the hypervisor 12, for example, each time a measurement result is obtained or results of a predetermined number of measurements are obtained, or each time a predetermined time period elapses. Here, the IO response 24 is assumed to pass measurement results to the hypervisor 12 each time the predetermined time period elapses.

The time setting program 22 changes a temporary dispatch time after obtaining the IO response 24. As a result, a combination of the set temporary dispatch time and the IO response average time obtained by setting the temporary dispatch time are stored as average IO response accumulation data 25. This accumulation data 25 is stored for each of the virtual machines 14. The accumulation data 25-1 is intended for the virtual machine 14-1, whereas the accumulation data 25-2 is intended for the virtual machine 14-2.

FIG. 6 illustrates a structure of the average IO response accumulation data. "domain" denoted as an item name is equivalent to identification data unique to a virtual machine 14. "1" in "domain1" denoted as a storage example represents a domain ID assigned to the virtual machine 14.

"Dispatch1" and "IO Time1" denoted as item names respectively represent data corresponding to the firstly set temporary dispatch time and obtained IO response average time. In this way, the denoted "1" represents the order of the set temporary dispatch time. The other numerical values are similarly applied.

Actual temporary dispatch times in "Dispatch1" and "Dispatch1" are, for example, 1 ms and 1.5 ms. Therefore, in this embodiment, the temporary dispatch time is assumed to be 1 ms as an initial value, which is incremented, for example, by 0.5 ms.

The IO response average time is 5.23 ms when the second temporary dispatch time is set, and is 7.0 ms when the 10th temporary dispatch time is set. The IO response average time is 7.5 ms when the 11th temporary dispatch time is set. Judging from the relationship illustrated in FIG. 3, it can be expected that the IO response is degraded when the seventh temporary dispatch time or so is set.

The time setting program 22 selects, for example, a temporary dispatch time at which the IO response is definitely degraded, a dispatch time set immediately before the temporary dispatch time, or a time between these temporary dispatch times as an optimum dispatch time. The dispatch time thus selected is hereinafter set as an optimum dispatch time. For example, a straight line linking IO response times at the temporary dispatch time at which the IO response is degraded, and a straight line linking IO response times to be regarded as being constant are assumed, and a time at which these straight lines intersect is considered as a time between the two temporary dispatch times. Here, assume that the temporary dispatch time immediately before the IO response is degraded is selected as the optimum dispatch time.

The dispatch time thus selected is validated for a predetermined time period. After the predetermined time period elapses from the setting, an optimum dispatch time is again identified. The reason is that a workload executed by the virtual machine 14 can possibly change as time elapses. Therefore, measures are taken to cope with a change in an optimum dispatch time according to a type of a workload to be executed, the number of workloads, or the like. The overhead of the hypervisor 12 can be reduced while high IO response performance is being kept. Therefore, an optimum dispatch time can be set regardless of a workload to be executed.

FIG. 7 illustrates contents of evaluations in this embodiment and the conventional techniques respectively for evaluation items. As the evaluation items, four items such as a hypervisor overhead, an IO response, optimization when workloads coexist, and measures taken to cope with a workload change are selected. The hypervisor overhead is evaluated as "high", "medium" and "low". The IO response is evaluated as "long", "medium" and "short". The optimization when workloads coexist, and the measures taken to cope with a workload changed are evaluated as "good", "medium" and "bad". The best evaluations respectively in the evaluation items are represented with circles in FIG. 7.

"(1)" to "(4)" in FIG. 7 respectively represent evaluation targets. Specifically, (1) represents the method implemented by using both a normal method, namely, the method executed by setting a dispatch time, and the method executed by detecting an idle time together. (2) represents the method executed by setting a short dispatch time. (3) represents the method preferentially assigning a CPU to a virtual machine waiting for an IO completion interrupt. (4) represents this embodiment. That is, all of (1) to (3) correspond to the above described conventional techniques.

As illustrated in FIG. 7, evaluations in all the evaluation items in this embodiment are "best" unlike the other conventional techniques. As a result, dispatch time setting (automatic adjustment) performed in this embodiment is very effective at optimizing a dispatch time.

Figure 8:
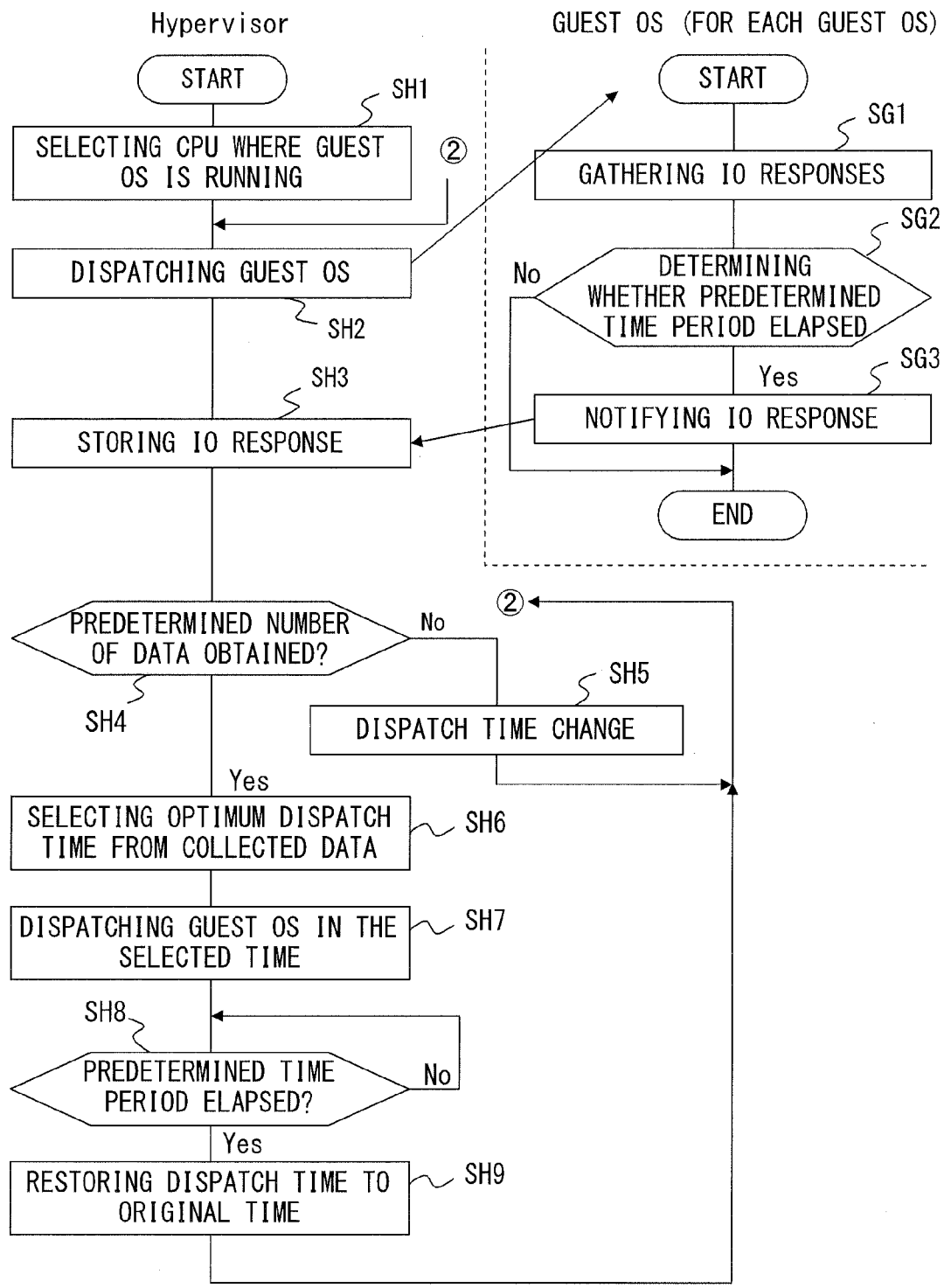
FIG. 8 is a flowchart illustrating a process for setting a dispatch time.

FIG. 8 is a flowchart illustrating a process for setting a dispatch time. This flowchart represents a flow of processes that are respectively executed by the hypervisor 12 and a guest OS running on the virtual machine 14 and are extracted. Operations of the hypervisor 12 and the guest OS running on the virtual machine 14 are described in detail next with reference to FIG. 8. A series of processes of the hypervisor 12 illustrated in FIG. 8 is executed at activation of the virtual machine 14 or at the timing of an instruction issued by an administrator.

The hypervisor 12 initially selects a physical CPU assigned to a virtual machine (denoted as a guest OS in the figure) for which a dispatch time is to be set, and decides a temporary dispatch time to be firstly set (step SH1). By selecting the physical CPU, the setting data 23 illustrated in FIG. 2 is stored.

After selecting the physical CPU, a dispatch for assigning the physical CPU to the virtual machine 14 in the decided temporary dispatch time is performed (step SH2). Thereafter, the hypervisor 12 enters a state of waiting for a notification of an IO response 24 from the virtual machine 14.

In the meantime, the guest OS of the virtual machine 14 measures an IO response time by using the measurement program 31 as a result of the dispatch, stores a measurement result, and gathers measurement results in order to calculate an IO response average time based on the measurement results (step SG1). Thereafter, the guest OS determines whether or not a predetermined time period has elapsed (step SG2). The predetermined time period is a time period set to periodically notify the IO response 24. This predetermined time period is compared with, for example, a time period elapsed from the termination of activation, or from the time point of notifying the preceding IO response 24. If the elapsed time is equal to or longer than the predetermined time period as a result of the comparison, the determination results in "YES". Then, the IO response 24 is created and notified (step SG3), and the series of processes is terminated. If the elapsed time is shorter than the predetermined time period, the determination results in "NO", and the series of processes is terminated.

As described above, on the hypervisor 12 side, the temporary dispatch time is changed after the IO response 24 is obtained. Accordingly, the measurement of an IO response time, and the gathering of measurement results are repeatedly performed until the predetermined time period elapses on the virtual machine 14 side. As a result, the IO response time measurement data 33 illustrated in FIG. 4 is deleted, for example, with the notification of the IO response 24. In this way, the time measurement data 33 is stored in each assigned temporary dispatch time. The number (count) of measurements of the time measurement data 33 is updated when the measurement results are gathered.

The hypervisor 12 to which the IO response 24 is notified stores an IO response average time within the IO response 24 along with the temporary dispatch time as average IO response accumulation data 25 (step SH3). After the IO response average time is stored, the flow goes to step SH4, in which whether or not a predetermined number of data pieces has been obtained is determined. As illustrated in FIG. 6, the temporary dispatch time is sequentially incremented by a predetermined time period. Accordingly, if a maximum time is set as a temporary dispatch time, the determination results in "YES", and the flow goes to step SH6. If the temporary dispatch time is not the maximum time, the determination results in "NO". Therefore, the flow goes back to the above described step SH2 after the dispatch time change process for changing a temporary dispatch time is executed (step SH5). As a result, the virtual machine 14 is caused to measure an IO response time in the changed temporary dispatch time.

In step SH6, an optimum dispatch time is selected from the gathered data, namely, the stored average IO response accumulation data 25. The selected dispatch time is validated as a dispatch time of the virtual machine 14 until a predetermined time period elapses (steps SH7 and SH8).

The predetermined time period is a time period set for determining timing of updating (refreshing) an optimum dispatch time. This update is performed to cope with a change in a workload executed by the virtual machine 14. This predetermined time period is compared with a time period elapsed from the setting of the preceding optimum dispatch time. If the elapsed time is equal to or longer than the predetermined time period as a result of the comparison, the determination in step SH8 results in "YES". Then, the flow goes back to the above described step SH2 after a temporary dispatch time to be firstly set is decided in step SH9. If the elapsed time is shorter than the predetermined time period, the determination in step SH8 results in "NO", and the flow goes back to step SH7. In this way, the process loop formed by steps SH7 and SH8 is continuously executed, thereby keeping the setting of an optimum dispatch time.

A workload executed by the virtual machine 14 changes depending on a time zone or the like in some cases. Accordingly, not the predetermined time period but, for example, a time at which a dispatch time is to be updated may be set. Alternatively, the predetermined time period and the time at which a dispatch time is to be updated may be combined.

In the process executed by the hypervisor 12, for example, the scheduler 21 is used in steps SH1 and SH2, and the time setting program 22 is used in the other steps SH3 to SH9. In this way, the scheduler 21 and the time setting program 22 are involved in the setting of an optimum dispatch time, namely, the automatic adjustment of a dispatch time. Accordingly, a program for automatically adjusting an optimum dispatch time in this embodiment is implemented as the hypervisor 12 including the scheduler 21 and the time setting program 22.

In this embodiment, a temporary dispatch time is changed by increasing the preceding temporary dispatch time by a predetermined time period (FIG. 6). However, an optimum dispatch time can possibly be equal to the precedingly set dispatch time, or can be almost unchanged. Accordingly, the IO response time may be measured by giving precedence over the vicinity of the precedingly set dispatch time. If the optimum dispatch time at this time point is equal to the preceding dispatch time or if a width of the change is equal to or less than a predetermined width, an optimum dispatch time can be identified with a smaller number of measurements.

Figure 9:
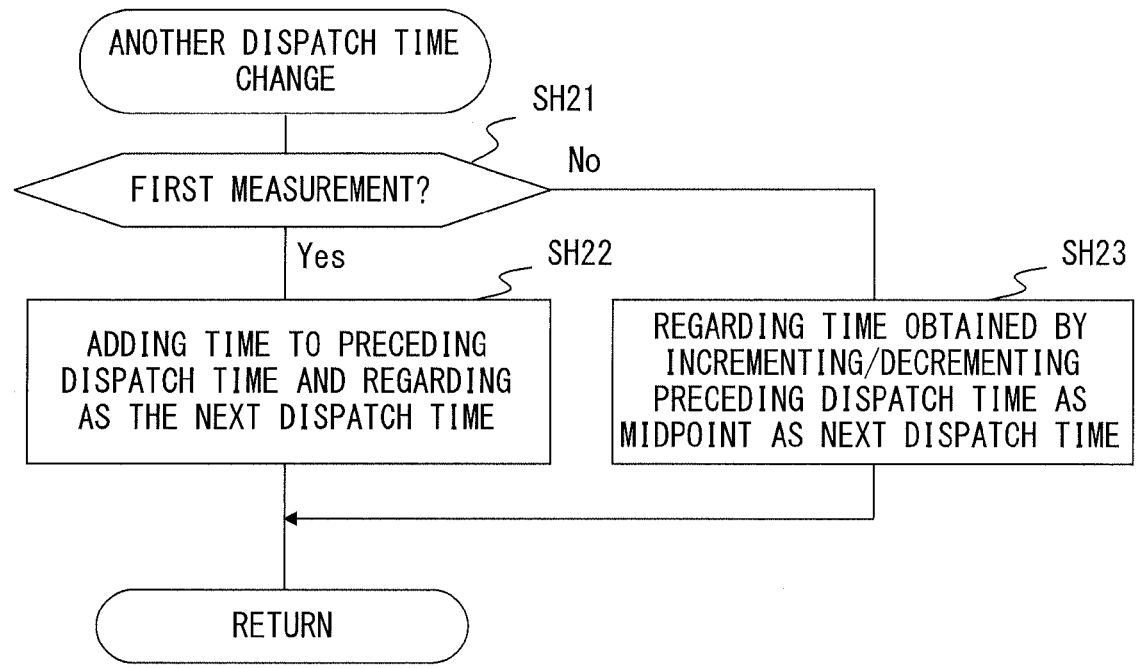
FIG. 9 is a flowchart illustrating another process for changing a dispatch time.

If the IO response time is measured by giving precedence over the vicinity of the precedingly set dispatch time, for example, another dispatch time change process illustrated in FIG. 9 may be executed. This change process is executed on the condition that an optimum dispatch time has been set. Therefore, if the determination of step SH4 results in "NO", it is necessary to execute a process for determining whether or not an optimum dispatch time has been set. If it is determined that the optimum dispatch time has been set as a result of this determination process, the other dispatch time change process illustrated in FIG. 9 is executed. If it is determined that the optimum dispatch time has not been set, the dispatch time change process in step SH5 is executed. In step SH9, it is desirable to make a change for setting the validated dispatch time as a temporary dispatch time.

If the other dispatch time change process illustrated in FIG. 9 is executed, there is a high possibility that the optimum dispatch time can be identified while an IO response time is being measured by a predetermined number of times. Accordingly, it is desirable to execute a process for selecting (identifying) the optimum dispatch time, and a process for determining whether or not the optimum dispatch time can be selected with the above process prior to the other dispatch time change process. Namely, it is desirable to execute the other dispatch time change process only if the optimum dispatch time cannot be selected. If the optimum dispatch time can be selected, the flow may go to step SH7.

With the other dispatch time change process illustrated in FIG. 9, whether or not a measurement is the first measurement is initially determined in step SH21. If the measurement results stored in step SH3 are those of the first measurement, the determination results in "YES". Then, a dispatch time obtained by incrementing the precedingly set temporary dispatch time by a predetermined time period is set as the next temporary dispatch time in step SH22. After the next temporary dispatch time is set, this change process is terminated. Alternatively, if the measurement results are not those of the first measurement, the determination results in "NO". Then, a time obtained by incrementing/decrementing the optimum dispatch time as a midpoint is set as the next temporary dispatch time. After the next temporary dispatch time is set, this change process is terminated.

For example, if the optimum dispatch time is 5.0 ms at the preceding time, a temporary dispatch time is sequentially changed from 5.5 ms to 4.5 ms to 6.0 ms to 4.0 ms to . . . at second and subsequent times by executing the other dispatch time change process. Therefore, if the width of the change from the optimum dispatch time preceding the current dispatch time to be decided as being optimum is relatively small, the dispatch time to be decided as being optimum can be identified with a smaller number of measurements. If contents of the average IO response accumulation data 25 are those illustrated in FIG. 6, 5.0 ms is set as the optimum dispatch time.

Figure 10:
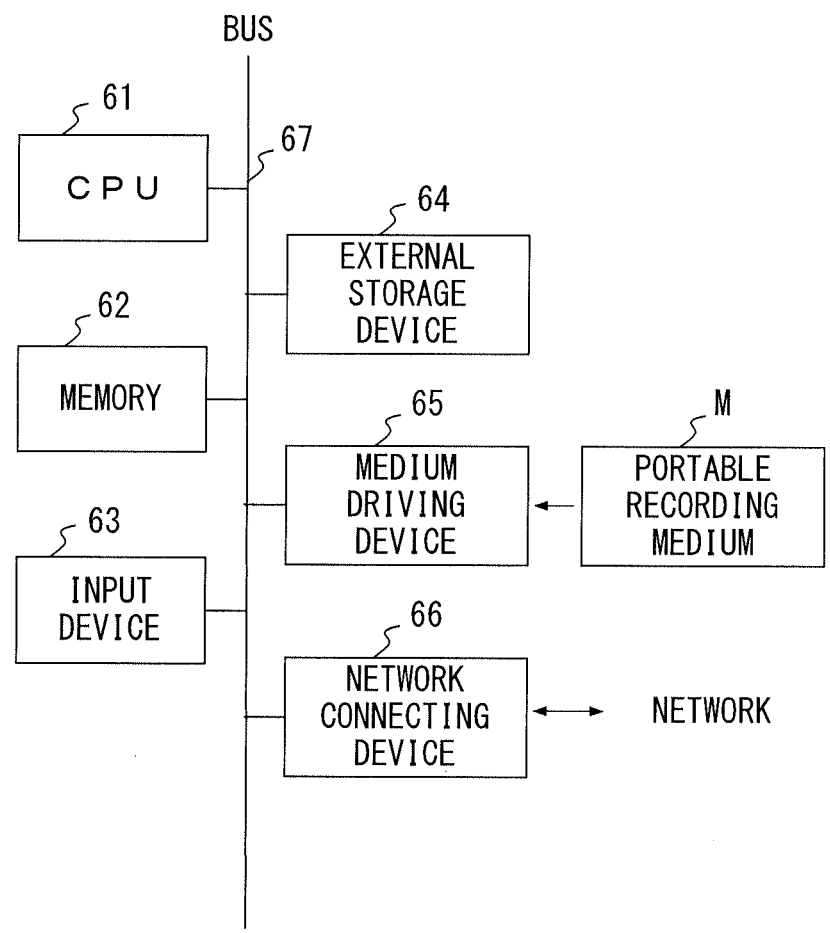
FIG. 10 illustrates one example of an embodiment of a hardware configuration.

FIG. 10 illustrates one example of an embodiment of a hardware configuration. A configuration example of the above described computer 1 is specifically described with reference to FIG. 10.

The computer illustrated in FIG. 10 includes a CPU 61, a memory 62, an input device 63, an external storage device 64, a medium driving device 65 and a network connecting device 66, which are interconnected by a bus 67. The configuration illustrated in this figure is merely one example. The configuration of the computer is not limited to this one.

The CPU 61 is a processor for controlling the entire computer, and is equivalent to a physical CPU that gives a control right to a virtual machine 14. FIG. 10 illustrates only one CPU. Actually, however, a plurality of CPUs are included. If the included CPU 61 is a multi-core type, each core is handled as one physical CPU.

The memory 62 is a semiconductor memory such as a RAM or the like for temporarily storing a program or data stored in an external storage device 64 (or on a portable recording medium M), for example, when the program is executed or the data is updated. The CPU 61 controls the entire computer by reading and executing the program in the memory 62.

The input device 63 is, for example, an interface for connecting, for example, to a console operated by an administrator. The input device 63 transmits/receives data to/from the console, and transmits received data to the CPU 61. As a result, the computer 1 operates according to an instruction received via the console.

The network connecting device 66 makes a communication with a network. The external storage device 64 is, for example, a hard disk device. The external storage device 64 is used to mainly store various types of data and programs.

The medium driving device 65 accesses the portable recording medium M such as an optical disc, a magneto-optical disc or the like.

The components 61 to 66 illustrated in FIG. 10 correspond to the hardware 11 virtualized by the hypervisor 12. In the configuration illustrated in FIG. 10, an IO is generated by an access to the external storage device 64, or by a communication made via the network connecting device 66. Therefore, both the external storage device 64 and the network connecting device 66 are IO resources.

The hypervisor 12, the host OS running on the virtual computer 13, and a guest OS running on each virtual machine 14 are stored, for example, in the external storage device 64. The system configuration illustrated in FIG. 1 is implemented in a way such that the CPU 61 reads and activates the hypervisor 12 in the memory 62, and the programs for the virtual machines 13, 14 are read and executed in the memory 62 according to a control of the hypervisor 12. The various types of processes illustrated in FIGS. 8 and 9 are implemented in a way such that the CPU 61 executes the hypervisor 12, the program (mainly a host OS) for the virtual machine 13, and the program (a guest OS, a workload or the like) for each virtual machine 14. The hypervisor 12 and the programs for the virtual machines 13 and 14 may be recorded and distributed on the recording medium M. Alternatively, the hypervisor 12 and the programs may be obtained with the network connecting device 66.

In this embodiment, the time setting program 22 is included in the hypervisor, 12. However, the time setting program 22 may not be included. Namely, the time setting program 22 may be included in any way as long as a temporary dispatch time set by the time setting program 22 can be assigned and an identified optimum dispatch time can be applied.

This embodiment is implemented by applying the present invention to one computer 1. However, the present invention can be applied also to a computer system built by using two or more computers. Accordingly, the present invention can be widely applied to computers (including a computer configuring a computer system). The application of the present invention is not limited to this embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A virtual machine assigning method for use in a processor included in an information processing device having a virtual machine monitoring unit and connected to an input/output device, the virtual machine assigning method comprising:

partitioning the processors into a plurality of partitioned processors;

setting a plurality of assignment times of virtual machines in the plurality of partitioned processors;

assigning the virtual machines to the plurality of partitioned processors based on the plurality of assignment times;

measuring a response time from outputting of an input/output request from each of the plurality of partitioned processors to the input/output device until inputting of a response to the input/output request into each of the plurality of partitioned processors from the input/output device in each of the plurality of assignment times by each of the plurality of partitioned processors to which the virtual machines are assigned;

extracting an optimum assignment time that is a maximum assignment time among assignment times corresponding to response times within a predetermined range based on the plurality of set assignment times and a plurality of measured response times; and assigning the extracted optimum assignment time to each of the plurality of virtual machines.

2. The virtual machine assigning method according to claim 1, wherein the measuring is measured by each of the plurality of partitioned processor to which the virtual machines are fixedly assigned.

3. The virtual machine assigning method according to claim 1, wherein the extracted optimum assignment time is periodically changed by extracting the optimum assignment time periodically.

4. The virtual machine assigning method according to claim 1, further comprises deciding an order of assigning the virtual machines to the plurality of partitioned processors based on the optimum assignment time.

5. A non-transitory computer-readable medium storing a virtual machine assigning program for directing a processor included in an information processing device having a virtual machine monitoring unit and connected to an input/output device to perform a process, the process comprising:

dividing the processors into a plurality of partitioned processors;

setting a plurality of assignment times of virtual machines in the plurality of partitioned processors;

assigning the virtual machines to the plurality of partitioned processors based on the plurality of assignment times;

measuring a response time from an outputting of an input/output request from each of the plurality of partitioned processors to the input/output device until an inputting of a response to the input/output request into each of the plurality of partitioned processors from the input/output device in each of the plurality of assignment times by each of the plurality of partitioned processors to which the virtual machines are assigned;

extracting an optimum assignment time that is a maximum assignment time among assignment times corresponding to response times within a predetermined range based on the plurality of set assignment times and a plurality of measured response times; and assigning the extracted optimum assignment time to each of the plurality of virtual machines.

6. The non-transitory computer-readable medium according to claim 5, wherein the measuring is measured by each of the plurality of partitioned processor to which the virtual machines are fixedly assigned.

7. The non-transitory computer-readable medium according to claim 5, wherein the extracted optimum assignment time is periodically changed by extracting the optimum assignment time periodically.

8. An information processing device connected to an input/output device, and having a virtual machine environment, the information processing device comprising:

a plurality of processors;

a partitioning unit configured to partition the processors into a plurality of partitioned processors;

a setting unit configured to set a plurality of assignment times of virtual machines in the plurality of partitioned processors;

an assigning unit configured to assign the virtual machines to the plurality of partitioned processors based on the plurality of assignment times;

a measuring unit configured to measure a response time from outputting of an input/output request from each of the plurality of partitioned processors to the input/output device until inputting of a response to the input/output request into each of the plurality of partitioned processors from the input/output device in each of the plurality of assignment times by each of the plurality of partitioned processors to which the virtual machines are assigned; and an extracting unit configured to extract an optimum assignment time that is a maximum assignment time among assignment times corresponding to response times within a predetermined range based on the plurality of set assignment times and a plurality of measured response times.

9. The information processing device according to claim 8, wherein the measuring unit fixedly assigns the virtual machine to one of the plurality of partitioned processors.

* * * * *